US008465575B2

(12) United States Patent
Tanaka et al.

(10) Patent No.: US 8,465,575 B2
(45) Date of Patent: Jun. 18, 2013

(54) DUST COLLECTOR

(75) Inventors: Toshio Tanaka, Osaka (JP); Tsunahiro Ohdou, Osaka (JP); Kanji Motegi, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 358 days.

(21) Appl. No.: 12/867,419

(22) PCT Filed: Feb. 20, 2009

(86) PCT No.: PCT/JP2009/000734
§ 371 (c)(1),
(2), (4) Date: Aug. 12, 2010

(87) PCT Pub. No.: WO2009/104411
PCT Pub. Date: Aug. 27, 2009

(65) Prior Publication Data
US 2010/0313761 A1  Dec. 16, 2010

(30) Foreign Application Priority Data

Feb. 20, 2008 (JP) ................................. 2008-039283

(51) Int. Cl.
*B03C 3/47* (2006.01)
(52) U.S. Cl.
USPC ........................................ 96/98; 96/27; 96/53
(58) Field of Classification Search
USPC ........... 96/27, 43–49, 52, 53, 69, 70, 98–100; 95/64–66, 71, 72
See application file for complete search history.

(56) References Cited

U.S. PATENT DOCUMENTS

| 4,597,780 | A  | * | 7/1986  | Reif ................................ 96/45 |
| 5,160,510 | A  | * | 11/1992 | Steinbacher et al. ............. 95/64 |
| 5,626,652 | A  | * | 5/1997  | Kohl et al. ........................ 96/45 |
| 6,471,753 | B1 | * | 10/2002 | Ahn et al. ......................... 96/27 |
| 6,500,240 | B1 |   | 12/2002 | Tomimatsu et al. |
| 6,508,861 | B1 | * | 1/2003  | Ray .................................. 95/79 |
| 6,783,575 | B2 | * | 8/2004  | Pasic et al. ....................... 96/44 |
| 6,843,835 | B2 | * | 1/2005  | Fornai et al. ..................... 96/53 |
| 7,938,885 | B2 | * | 5/2011  | Huang ............................... 95/65 |
| 2006/0191413 | A1 | * | 8/2006  | Weidmann ....................... 96/44 |

FOREIGN PATENT DOCUMENTS

| JP | 16-8387 Y1   |   | 6/1941 |
| JP | 50-26069 Y1  |   | 8/1975 |
| JP | 51-57074 A   |   | 5/1976 |
| JP | 52-59374 A   | * | 5/1977 |
| JP | 56-34565 U   |   | 4/1981 |
| JP | 61-18455 A   |   | 1/1986 |
| JP | 10-156214 A  |   | 6/1998 |

(Continued)

*Primary Examiner* — Richard L Chiesa
(74) *Attorney, Agent, or Firm* — Birch, Stewart, Kolasch & Birch, LLP

(57) ABSTRACT

Disclosed is a dust collector (30) that is disposed in an air passageway (15) to which water droplets (21*a*) are supplied, and that includes a dust collecting electrode portion (31*b*) which electrically attracts dust charged in the air. The dust collecting electrode portion (31*b*) is made of a plate-like member having a mesh-like structure with a plurality of pores, thereby reducing an interfacial tension between the water droplets (21*a*) adhering on the surface of the dust collecting electrode portion (31*b*) and the dust collecting electrode portion (31*b*). Thus, water droplets are prevented from increasing in size on the surface of a dust collecting electrode, and a decrease in the dust collection capability due to adhesion of dust or the like is reduced.

7 Claims, 6 Drawing Sheets

FOREIGN PATENT DOCUMENTS

| | | |
|---|---|---|
| JP | 2000-189836 A | 7/2000 |
| JP | 2000-354787 A | 12/2000 |
| JP | 3126819 B2 | 1/2001 |
| JP | 2001-121030 A | 5/2001 |

\* cited by examiner

DUST COLLECTOR

The present application is a national stage of International Application PCT/JP2009/000734 filed on Feb. 20, 2009, which claims priority from Japanese Application 2008-039283 filed on Feb. 20, 2008. The entirety of each of these applications is hereby incorporated by reference.

TECHNICAL FIELD

The present invention relates to dust collectors.

BACKGROUND ART

Air purification devices for removing dust or odorous substances in the air have been known, and are widely used for purifying room air or treating gases exhausted from kitchens, factories, etc.

Patent Document 1 discloses an air purification device which treats gases exhausted from a factory. The air purification device includes a dust collector provided in an air passageway through which air flows. The dust collector has a charge portion and a dust collecting portion. A corona discharge is caused in the charge portion, and the dust (including greasy fumes, water vapor, etc.) in the air is charged by the corona discharge to carry a predetermined charge. The dust collecting portion includes a dust collecting electrode for electrically attracting the charged dust to the dust collecting electrode. As a result, the dust in the air is captured on the surface of the dust collecting electrode.

CITATION LIST

Patent Document
PATENT DOCUMENT 1: Japanese Patent No. 3126819

SUMMARY OF THE INVENTION

Technical Problem

However, in the conventional dust collectors, the dust collection capability gradually decreases due to dust adhering to the electrodes of the charge portion and the dust collecting portion. Specifically, in the case of treatment of an exhausted gas from a factory as in Patent Document 1, the air to be treated contains a large amount of oil mist, which creates an oil film on the surface of the dust collecting electrode etc., and therefore, water droplets easily adhere to the surface of the dust collecting electrode. As a result, these fine water droplets (water droplets having a diameter of 1 mm or less) gather together on the surface of the dust collecting electrode and increase in size to result in the generation of a large droplet (having a diameter of several millimeters).

If fine water droplets gather together on the surface of the dust collecting electrode and increase in size as described above, an abnormal discharge such as a spark may be caused at the time of discharge. As a result, life of the dust collecting electrode may be shortened and the dust collection capability may be decreased.

The present invention was made in view of the above problems, and it is an objective of the invention to provide a dust collector that is capable of preventing water droplets from increasing in size on the surface of a dust collecting electrode, and capable of avoiding a decrease in the dust collection capability due to adhesion of dust.

Solution to the Problem

To achieve the above objective, the present invention uses a dust collecting electrode having a suitable surface shape, thereby reducing an interfacial tension between the water droplets adhering to the surface of the dust collecting electrode and the dust collecting electrode.

Specifically, the first aspect of the present invention is intended for a dust collector disposed in an air passageway (15) to which water droplets (21a) are supplied, for collecting dust including an oil content in an air. The present invention includes the following solutions.

That is, the first aspect of the present invention includes, a dust collecting electrode (31b) which electrically attracts dust charged in the air, wherein the dust collecting electrode (31b) is configured to reduce an interfacial tension between the water droplets (21a) adhering to a surface of the dust collecting electrode (31b) and the dust collecting electrode (31b).

Here, the word "dust" as used in the first aspect of the present invention does not only include fine solid particles in the air, but also includes, for example, oil mists and fine liquid particles such as water vapor, and refers to particles which can be collected by the dust collecting electrode (31b).

The second aspect of the present invention is that the dust collecting electrode (31b) is made of a porous material in the first aspect of the present invention.

The third aspect of the present invention is that the dust collecting electrode (31b) is made of a plate-like member having a mesh-like structure with a plurality of pores, and a wire diameter of a wire rod (35) which forms the dust collecting electrode (31b) is set to 0.1 mm or more and 0.5 mm or less, in the first or second aspect of the present invention.

The fourth aspect of the present invention is that the dust collecting electrode (31b) is made of a plate-like member having a mesh-like structure with a plurality of pores, and a wire diameter L of a wire rod (35) which forms the dust collecting electrode (31b), and an opening width W of the mesh are set to satisfy a condition $1 \leq W/L \leq 4$, in any one of the first to the third aspects of the present invention.

The fifth and the ninth aspects of the present invention are that the dust collecting electrode (31b) is disposed in a vertical position, and the dust collecting electrode (31b) is provided with a pair of reinforcing members (36b) which extend in a vertical direction along the surface of the dust collecting electrode (31b) and by which the dust collecting electrode (31b) is sandwiched, in the third or fourth aspect of the present invention.

The sixth and the tenth aspects of the present invention are that the dust collecting electrode (31b) is disposed in a vertical position, the dust collecting electrode (31b) is provided with a pair of reinforcing members (36a) which extend in a horizontal direction along the surface of the dust collecting electrode (31b) and by which the dust collecting electrode (31b) is sandwiched, and the pair of reinforcing members (36a) are disposed at locations which do not overlap with each other when viewed from a direction along the surface of the dust collecting electrode (31b), in the third or fourth aspect of the present invention.

The seventh aspect of the present invention is that a recessed and protruding portion is formed in the surface of the dust collecting electrode (31b), in the first aspect of the present invention.

The eighth aspect of the present invention is that at least the surface of the dust collecting electrode (31b) is made of a hydrophilic material, in any one of the first to the seventh aspects of the present invention.

Advantages of the Invention

According to the first aspect of the present invention, the dust collecting electrode (31b) has a suitable surface shape, thereby reducing an interfacial tension between water droplets (21a) adhering on the surface of the dust collecting electrode (31b) and the dust collecting electrode (31b). It is thus possible to prevent the water droplets (21a) adhering on the surface from gathering together and increasing in size, and possible to prevent an abnormal discharge, such as a spark, caused by a discharge from the dust collecting electrode (31b). Therefore, life of the dust collecting electrode (31b) can be extended and a decrease in the dust collection capability due to adhesion of dust can be reduced. As a result, the dust collection capability can be maintained for a long time.

According to the second aspect of the present invention, the dust collecting electrode (31b) is made of a porous material. Thus, even if water droplets (21a) adhere to the surface of the dust collecting electrode (31b), the water droplets (21a) enter in the pores in the surface, thereby making it possible to reduce the interfacial tension. As a result, it is possible to prevent the water droplets (21a) adhering to the surface from gathering together and increasing in size, and possible to prevent an abnormal discharge, such as a spark, induced by a discharge from the dust collecting electrode (31b).

According to the third aspect of the present invention, the dust collecting electrode (31b) is made of a plate-like member having a mesh-like structure with a plurality of pores, and a wire diameter of a wire rod (35) which forms the mesh is set to 0.1 mm or more and 0.5 mm or less. Therefore, the present invention is advantageous in reducing an interfacial tension between the water droplets (21a) adhering to the surface of the dust collecting electrode (31b) and the dust collecting electrode (31b). Further, a water layer is formed on the surface of the dust collecting electrode (31b), and an oil content adhering to the surface is dissolved in the water layer. Therefore, the oil content can be easily washed off.

According to the fourth aspect of the present invention, a wire diameter L of a wire rod (35) which forms the dust collecting electrode (31b) and an opening width W of the mesh are set to satisfy a condition, $1 \leq W/L \leq 4$. Therefore, the present invention is advantageous in reducing an interfacial tension between the water droplets (21a) adhering to the surface of the dust collecting electrode (31b) and the dust collecting electrode (31b). In other words, if the opening width W is too large, no water layer is formed on the surface of the dust collecting electrode (31b), and the pores remain open. As a result, the dust collection efficiency decreases. On the other hand, if the opening width W is too small, it reduces the effect of reducing the interfacial tension between the water droplets (21a) and the dust collecting electrode (31b). Thus, setting the conditions for the mesh structure based on the wire diameter L and the opening width W as in the present invention, can efficiently reduce the interfacial tension between the water droplets (21a) and the dust collecting electrode (31b).

According to the fifth and the ninth aspects of the present invention, the dust collecting electrode (31b) is disposed in a vertical position, and the dust collecting electrode (31b) is sandwiched between a pair of reinforcing members (36b) which extend in a vertical direction along the surface of the dust collecting electrode (31b). Therefore, the dust collecting electrode (31b) having a mesh structure can be reinforced, and at the same time, the water droplets (21a) can run down smoothly along the surface of the dust collecting electrode (31b).

Specifically, in the case where the pair of reinforcing members (36b) are disposed so as to extend in a horizontal direction along the surface of the dust collecting electrode (31b), the water droplets (21a) running down the surface of the dust collecting electrode (31b) may be retained at the upper edge portions of the reinforcing members (36b) and gather together to increase in size. As a result, an abnormal discharge such as a spark may be caused. However, if the pair of reinforcing members (36b) are disposed so as to extend in a vertical direction along the dust collecting electrode (31b) as in the present invention, the water droplets (21a) run down the surface of the dust collecting electrode (31b) smoothly along the side edge portions of the reinforcing members (36b). Therefore, the water droplets (21a) are not retained at the edges of the reinforcing members (36b). It is therefore possible to prevent the water droplets (21a) from gathering together and increasing in size, while reinforcing the dust collecting electrode (31b) having a mesh structure.

According to the sixth and the tenth aspects of the present invention, the dust collecting electrode (31b) is disposed in a vertical position, and the dust collecting electrode (31b) is sandwiched between the pair of reinforcing members (36a) which extend in a horizontal direction along the surface of the dust collecting electrode (31b) and which are disposed at locations that do not overlap with each other when viewed from a direction along the dust collecting electrode (31b). Therefore, the dust collecting electrode (31b) having a mesh structure can be reinforced, and at the same time, the water droplets (21a) can run down smoothly along the surface of the dust collecting electrode (31b).

Specifically, in the case where the dust collecting electrode (31b) is sandwiched between the pair of reinforcing members (36a) disposed at locations which overlap with each other when viewed from a direction along the surface of the dust collecting electrode (31b), water droplets (21a) running down the surface of the dust collecting electrode (31b) may be retained at the upper edge portions of the reinforcing members (36a), and gather together and increase in size. As a result, an abnormal discharge such as a spark may be caused. However, if the pair of reinforcing members (36a) are disposed at locations which do not overlap with each other when viewed from a direction along the dust collecting electrode (31b) as in the present invention, the water droplets (21a) running down the surface of the dust collecting electrode (31b) reach the upper edge portion of the reinforcing member (36a) disposed on the front surface of the dust collecting electrode (31b), and then, move to the rear surface through the pores of the mesh and run down without being retained at the upper edge portion. The water droplets (21a) having reached the upper edge portion of the reinforcing members (36a) disposed on the rear surface, are not retained at the upper edge portion, but move to the front surface again through the pores of the mesh and run down.

In other words, the water droplets (21a) are not retained at the upper edge portions of the reinforcing members (36a), and it is possible to prevent the water droplets (21a) from gathering together and increasing in size, while reinforcing the dust collecting electrode (31b) having a mesh structure.

According to the seventh aspect of the present invention, a recessed and protruding portion is formed in the surface of the dust collecting electrode (31b). Thus, the water droplets (21a) adhering to the surface enter in the recessed and protruding portion, thereby making it possible to reduce the interfacial tension between the water droplets and the dust collecting electrode (31b).

According to the eighth aspect of the present invention, at least the surface of dust collecting electrode (31b) is made of a hydrophilic material. Therefore, the water droplets (21a) adhering to the surface penetrate into the surface, thereby reducing the interfacial tension.

Figure 1:
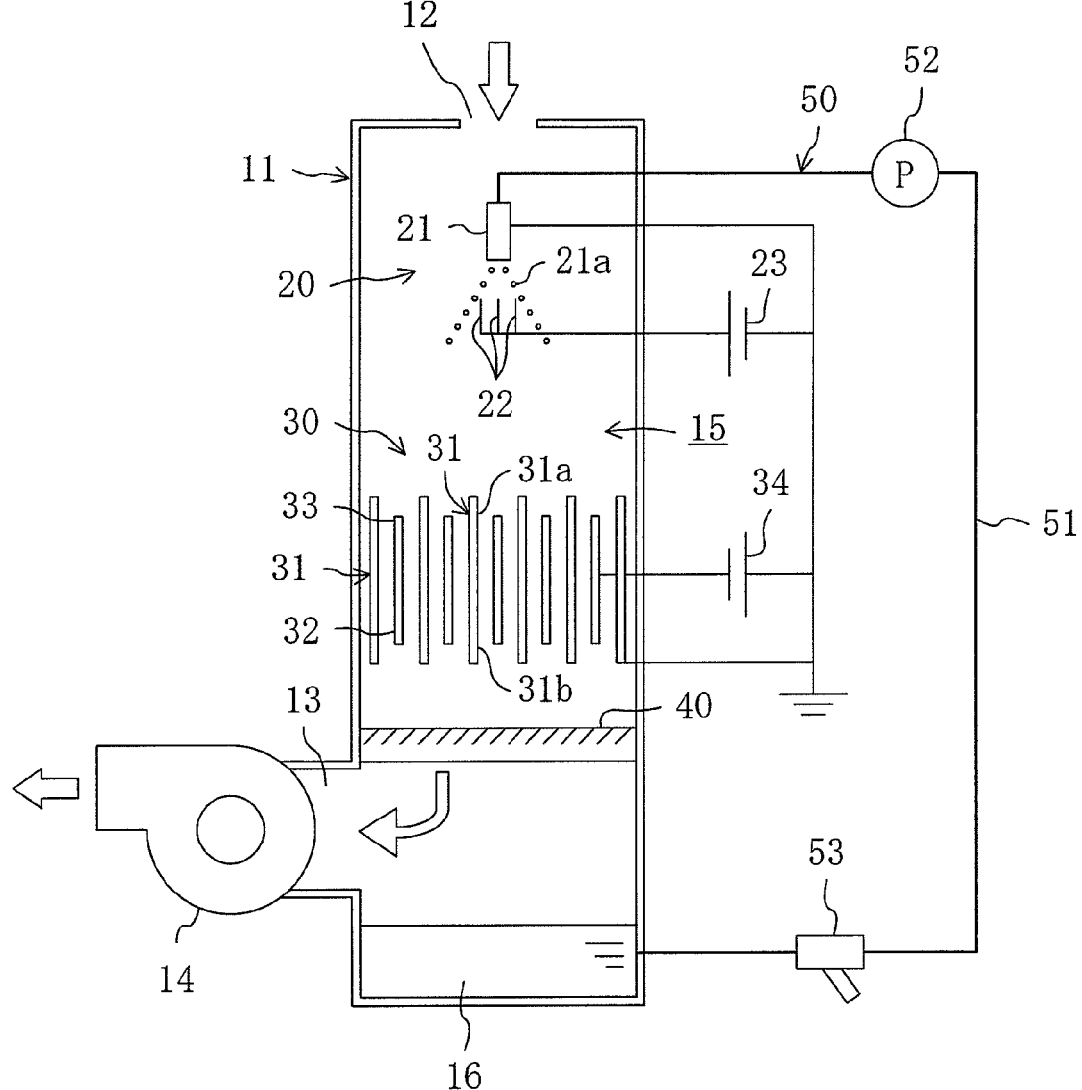
FIG. 1 is a front view showing a general structure of an air purification device having a dust collector according to an embodiment of the present invention.

DESCRIPTION OF REFERENCE CHARACTERS 15 air passageway
30 dust charge and collecting portion (dust collector)
21a water droplets
31b dust collecting electrode portion (dust collecting electrode)
32 second electrode plate (dust collecting electrode)
35 wire rod
36a horizontal reinforcing member (reinforcing member)
36b vertical reinforcing members (reinforcing member)

DESCRIPTION OF EMBODIMENTS

An embodiment of the present invention will be described with reference to the drawings. The following embodiment is merely a preferred example in nature, and is not intended to limit the scope, applications, and use of the invention.

FIG. 1 is a front view of a general structure of an air purification device having a dust collector according to an embodiment of the present invention. The air purification device (10) treats air (exhaust gas) exhausted from kitchen space such as in a restaurant and a hotel. The air purification device (10) removes oil mists (fine particles of an oil content), other harmful substances, odorous substances, etc., in the air.

As shown in FIG. 1, the air purification device (10) includes a vertically elongated casing (11). The casing (11) has a hollow, circular cylindrical shape or a rectangular cylindrical shape. An inlet (12) is open in the upper portion of the casing (11). The inlet (12) communicates with the kitchen space through a duct or the like, which is not shown. Further, an outlet (13) is open in the lower portion of the casing (11), for example, in a side surface of the casing (11). The outlet (13) communicates with the outside. A blower fan (14) for blowing air is provided at the outlet (13).

Further, an air passageway (15) through which air flows from the inlet (12) to the outlet (13) is formed in the casing (11). In other words, the air passageway (15) is formed in the casing (11) such that air can flow downward. The casing (11) includes a reservoir (16) at a bottom portion. Water sprayed from a spray nozzle (21), described later, is collected and stored in the reservoir (16).

A discharge spray portion (20), a dust charge and collecting portion (30) serving as a dust collector, and a demister portion (40) which physically captures water droplets (21a) contained in the air are provided in the air passageway (15), sequentially from the upper side to the lower side of the air passageway (15) (from the upstream side to the downstream side of the air flow).

The discharge spray portion (20) includes a spray nozzle (21) and a discharge electrode (22). The spray nozzle (21) is a nozzle for spraying water to the air, and its spray opening is oriented downward. The spray nozzle (21) is configured to eject sprayed water in the form of a hollow cone. In other words, in a space around the spray nozzle (21), the sprayed water exists only in a space where the hollow cone is formed, but does not substantially exist in the interior of the hollow cone.

A discharge end of a water circulation channel (51) is connected to the upper end of the spray nozzle (21). An intake end of the water circulation channel (51) communicates with the reservoir (16). That is, the water circulation channel (51) constitutes a channel for transferring the water accumulated in the reservoir (16) to the spray nozzle (21). Further, the water circulation channel (51) is provided with a water circulation pump (52) and a water filter (53), sequentially from the discharge side to the intake side. The water circulation pump (52) forms a water transfer means which pumps up the water accumulated in the reservoir (16) up to the spray nozzle (21). The water filter (53) is a means for physically capturing fine dust (solid particles) contained in the water flowing in the water circulation channel (51), and forms a water purification means for purifying the water. The water circulation channel (51) and the water circulation pump (52) form a water circulation mechanism (50) for transferring the water accumulated in the reservoir (16) to the spray nozzle (21).

Three discharge electrodes (22) are provided at a lower side of the spray nozzle (21). The discharge electrodes (22) have a needle- or rod-like shape, and are held, for example, on the casing (11) in a vertical position. Tip portions of the discharge electrodes (22) are opposed to the spray opening of the spray nozzle (21). Further, the discharge electrodes (22) are located in the interior of the hollow cone space where the sprayed water of the spray nozzle (21) exists.

A power supply (23) is connected to the spray nozzle (21) and the discharge electrodes (22) via a predetermined energizing path. It is preferable that the power supply (23) is a high-voltage direct-current power supply, but may be an alternating-current power supply or a pulse power supply. Further, the power supply (23) is preferably a power supply which keeps a value of discharge current from the discharge electrodes (22) constant, that is, a power supply which is controlled for constant current.

In the present embodiment, the spray nozzle (21) serves as a negative pole, and the discharge electrodes (22) serve as a positive pole. An electric potential difference is applied between the spray nozzle (21) and the discharge electrodes (22) by the power supply (23). As a result, a streamer discharge is caused at the discharge spray portion (20), from the discharge electrodes (22) to the sprayed water.

Figure 2:
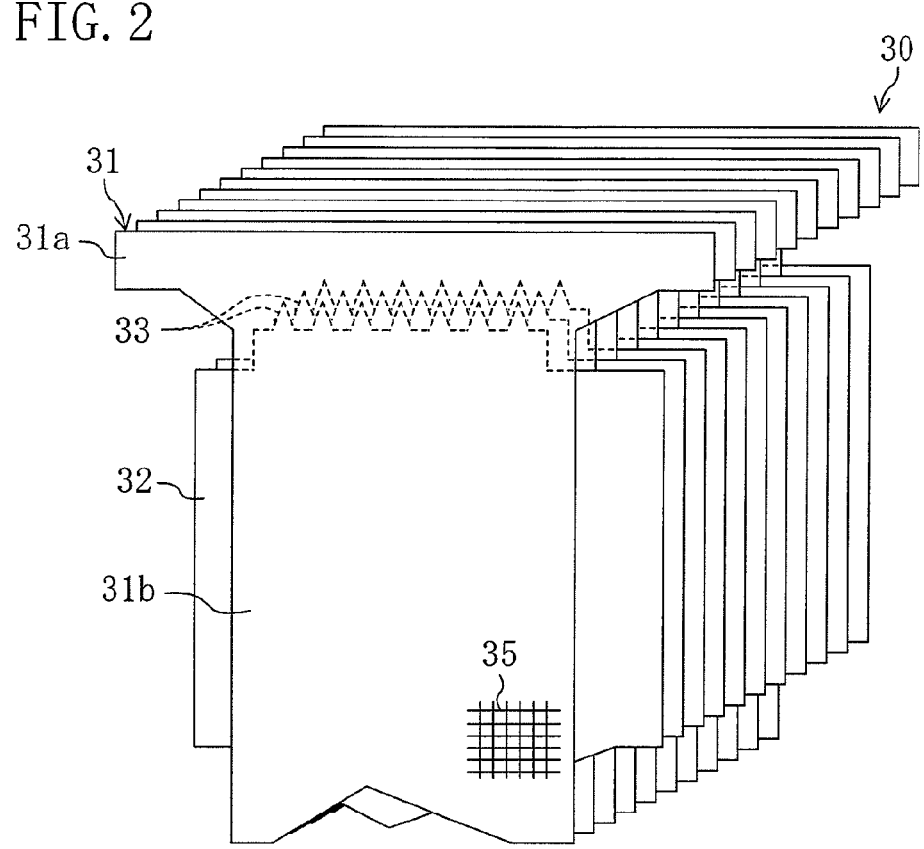
FIG. 2 is an oblique view showing an enlarged structure of a dust charge and collecting portion.

FIG. 2 is an oblique view of an enlarged structure of the dust charge and collecting portion. As shown in FIG. 1 and FIG. 2, the dust charge and collecting portion (30) includes a first electrode plate (31), a second electrode plate (32), and an ionizing electrode (33).

The first electrode plates (31) has a vertically long, plate-like shape. In the air passageway (15), a plurality of first electrode plates (31) are held in a vertical position and are arranged parallel to each other, with a predetermined interval between each other. A generally half portion on the upper side (upstream side) of each first electrode plate (31) forms a charge electrode portion (31a), and a generally half portion on the lower side (downstream side) thereof forms a dust collecting electrode portion (31b). In other words, the first electrode plates (31) includes the charge electrode portion (31a) and the dust collecting electrode portion (31b) integrally formed with each other.

The ionizing electrode (33) is provided in a middle position between adjacent charge electrode portions (31a). The ionizing electrode (33) is a saw-toothed tip portion of the second electrode plate (32). The ionizing electrode (33) is in parallel with the first electrode plates (31) and forms a pointed protrusion which protrudes upward. The charge electrode portion (31a) and the ionizing electrode (33) form a charge portion for charging dust (mainly oil mists) in the air. The ionizing electrode (33) may, for example, be a separate electrode from the second electrode plate (32), or may be formed of an ionizing wire having a rod-like shape or a linear shape.

The second electrode plate (32) is provided in a middle position between adjacent dust collecting electrode portions (31b). The second electrode plate (32) is in parallel with the first electrode plates (31) and has a plate-like shape extending in a horizontal direction. The second electrode plate (32) is arranged so as to face the adjacent collecting electrode portions (31b). The second electrode plate (32) and the dust collecting electrode portions (31b) form a dust collecting portion for electrically attracting and capturing the dust charged at the charge portion. Further, a power supply (34) is connected to the first electrode plates (31) and the second electrode plate (32) via a predetermined energizing path.

According to the present embodiment, the first electrode plates (31) serve as a positive pole, and the second electrode plates (32) serve as a negative pole. Therefore, negatively charged oil mists or the like adhere to the surface of the dust collecting electrode portion (31b) serving as a positive pole.

Figure 3:
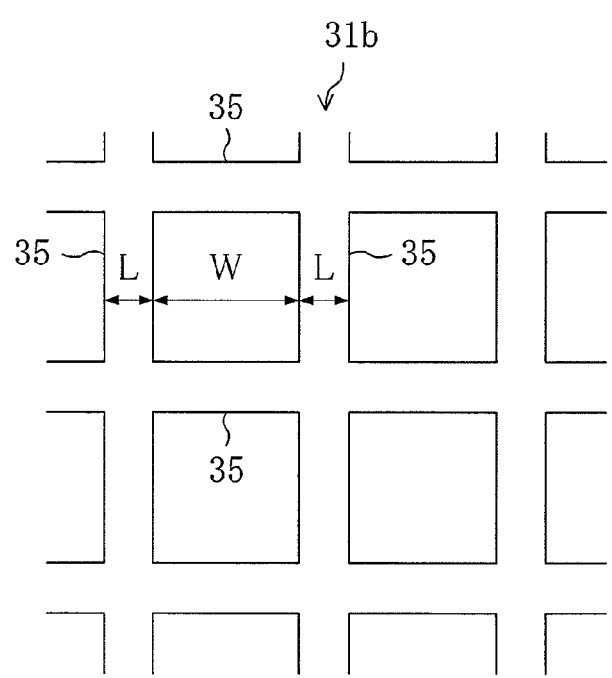
FIG. 3 is a front view showing an enlarged view of part of a mesh structure of a dust collecting electrode portion of a first electrode plate.

FIG. 3 is an enlarged front view of part of a mesh structure of the dust collecting electrode portion of the first electrode plate. As shown in FIG. 3, the dust collecting electrode portion (31b) of each first electrode plate (31) has a mesh structure having a plurality of pores. Specifically, the wire diameter L of a wire rod (35) which forms the mesh portion is set to 0.1 mm or more and 0.5 mm or less. Further, the opening width W of the mesh is set to satisfy the formula (I).

$$1 \leq W/L \leq 4 \tag{1}$$

This structure has an advantage in reducing an interfacial tension between the dust collecting electrode portion (31b) and the droplets (21a) adhering to the surface of the dust collecting electrode portion (31b) of the first electrode plates (31). In other words, if the opening width W is too large, no water layer is formed on the surface of the dust collecting electrode portion (31b), and the pores remain open. As a result, the dust collection efficiency decreases. On the other hand, if the opening width W is too small, it reduces the effect of reducing the interfacial tension between the water droplets (21a) and the dust collecting electrode portion (31b). Thus, setting the conditions for the mesh structure based on the wire diameter L and the opening width W of the wire rod (35) as in the present invention, can efficiently reduce the interfacial tension.

With this structure, it is possible to prevent the water droplets (21a) adhering on the surface from gathering together and increasing in size, and prevent an abnormal discharge, such as a spark, caused by the discharge at the charge portion. Therefore, life of the dust collecting electrode portion (31b) can be extended and a decrease in the dust collection capability due to adhesion of dust can be reduced. As a result, the dust collection capability can be maintained for a long time.

Figure 4:
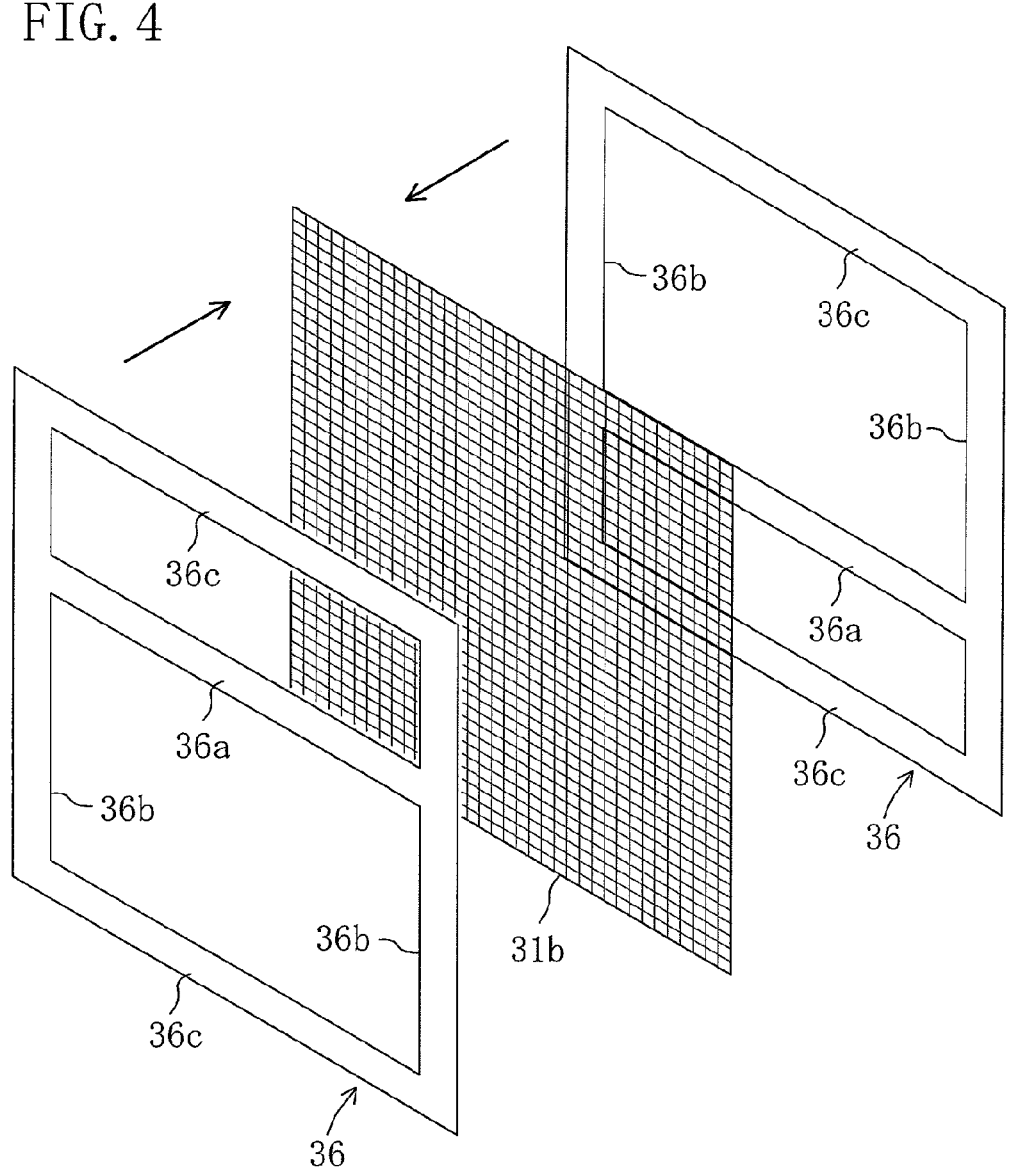
FIG. 4 is an oblique view showing a structure of a pair of reinforcing frame members.

FIG. 4 is an oblique view of a structure of a pair of reinforcing frame members. As shown in FIG. 4, the dust collecting electrode portion (31b) of the first electrode plate (31) is a plate-like member having a mesh-like structure. Thus, to keep the strength of the dust collecting electrode portion (31b), it is preferable that the dust collecting electrode portion (31b) is sandwiched between a pair of reinforcing frame members (36, 36).

Specifically, as shown in FIG. 4, the surface of the dust collecting electrode portion (31b) is sandwiched between the reinforcing frame members (36). Each reinforcing frame member (36) includes a horizontal reinforcing member (36a) which extends horizontally along the surface of the dust collecting electrode portion (31b) at a location displaced from a middle position of the dust collecting electrode portion (31b) in a vertical direction, vertical reinforcing members (36b) which extend in a vertical direction along both left and right ends of the dust collecting electrode portion (31b), and outer frame members (36c) which extend in a horizontal direction along both ends of the dust collecting electrode portion (31b) in the vertical direction. The reinforcing frame members (36) are disposed on both sides of the dust collecting electrode portion (31b) to have the dust collecting electrode portion (31b) sandwiched between the reinforcing frame members (36).

Here, the horizontal reinforcing members (36a) are disposed at locations which do not overlap with each other when viewed from a direction along the surface of the dust collecting electrode portion (31b). With this structure, the dust collecting electrode portion (31b) having a mesh structure can be reinforced, and at the same time, the water droplets (21a) can run down smoothly along the surface of the dust collecting electrode portion (31b).

Figure 5:
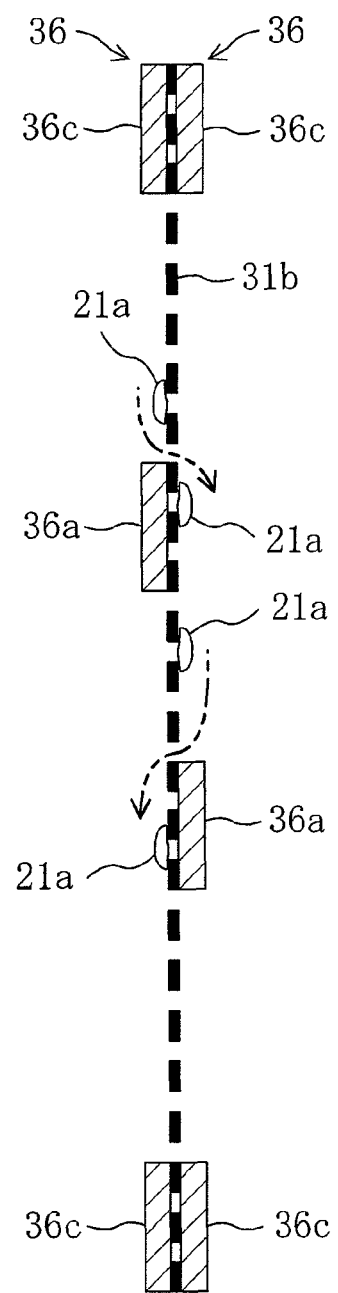
FIG. 5 is a cross section viewed from a side, for illustrating a movement of water droplets running down the surface of the dust collecting electrode portion.

Specifically, in the case where the dust collecting electrode portion (31b) is sandwiched such that the pair of horizontal reinforcing members (36a) are disposed at locations which overlap with other when viewed from a direction along the surface of the dust collecting electrode portion (31b), the water droplets (21a) running down the surface of the dust collecting electrode portion (31b) may be retained at the upper edge portion of the horizontal reinforcing members (36a) and gather together to increase in size. However, if the pair of horizontal reinforcing members (36a) are disposed at locations which do not overlap with each other when viewed from a direction along the surface of the dust collecting electrode portion (31b) as in the present invention, the water droplets (21a) running down the surface of the dust collecting electrode portion (31b) reach the upper edge portion of the horizontal reinforcing member (36a) disposed on the front surface of the dust collecting electrode portion (31b), and then, move to the rear side of the dust collecting electrode portion (31b) through pores of the mesh and run down without being retained at the upper edge portion, as shown in FIG. 5. The water droplets (21a) having reached the upper edge portion of the horizontal reinforcing member (36a) disposed on the rear side, are not retained at the upper edge portion, but move to the front surface again through the pores of the mesh and run down.

Further, owing to the pair of vertical reinforcing members (36b) disposed so as to extend in a vertical direction along the dust collecting electrode portion (31b), the water droplets (21a) run down the surface of the dust collecting electrode portion (31b) smoothly along the side edge portions of the vertical reinforcing members (36b). Thus, the water droplets (21a) are not retained at the edge of the vertical reinforcing members (36b). It is therefore possible to prevent the water droplets (21a) from gathering together and increasing in size, while reinforcing the dust collecting electrode portion (31b) having a mesh structure.

Figure 8:
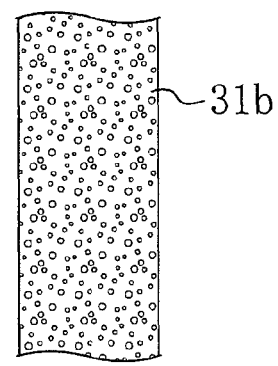
FIG. 8 is an enlarged view of part of another structure of the dust collecting electrode portion.
Figure 9:
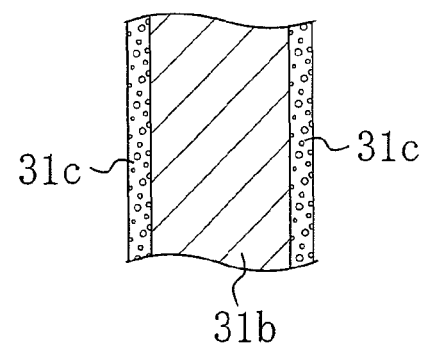
FIG. 9 is an enlarged cross section of another structure of the dust collecting electrode portion.

In the present embodiment, the dust collecting electrode portion (31b) of the first electrode plates (31) has a mesh structure. However, the structure is not limited to the mesh structure, but any structure may be adopted as long as the structure is such that can reduce an interfacial tension between the water droplets (21a) adhering to the surface and the dust collecting electrode portion (31b). For example, the dust collecting electrode portion (31b) may be made of a porous material (see FIG. 8), such as ceramics, to catch the water droplets (21a) in the pores in the surface, thereby reducing the interfacial tension. Further, the surface may be made of a hydrophilic material, or a hydrophilic material may be coated on the surfaces of the dust collecting electrode portion (31b) having a mesh structure, the dust collecting electrode portion (31b) made of a porous material, and the dust collecting electrode portion (31b) which is brushed, described below, in order to form a coating (31c) (see FIG. 9) into which the water droplets (21a) adhering to the surfaces penetrate, thereby reducing the interfacial tension.

Figure 6:
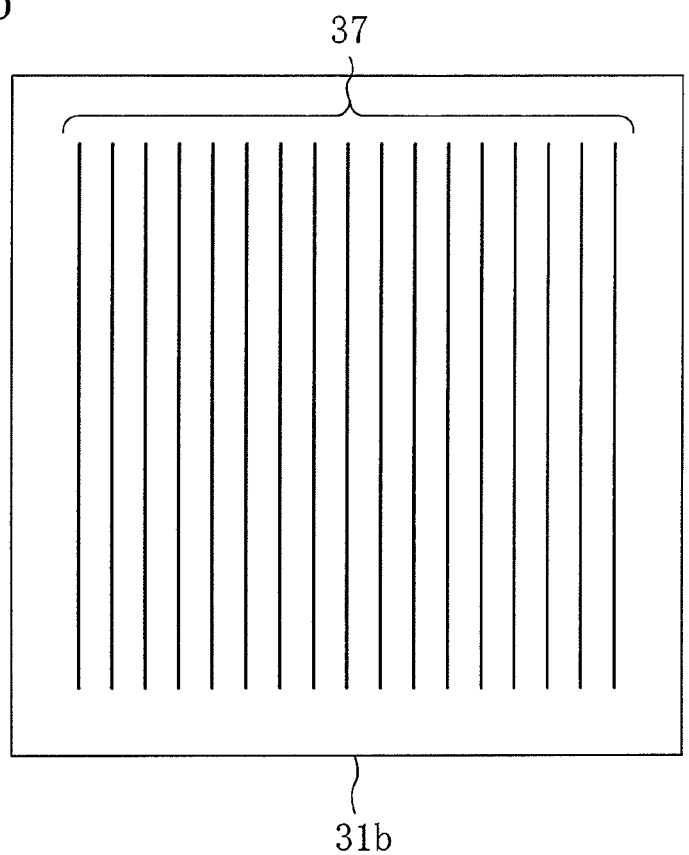
FIG. 6 is a plan view showing another structure of the dust collecting electrode portion.
Figure 7:
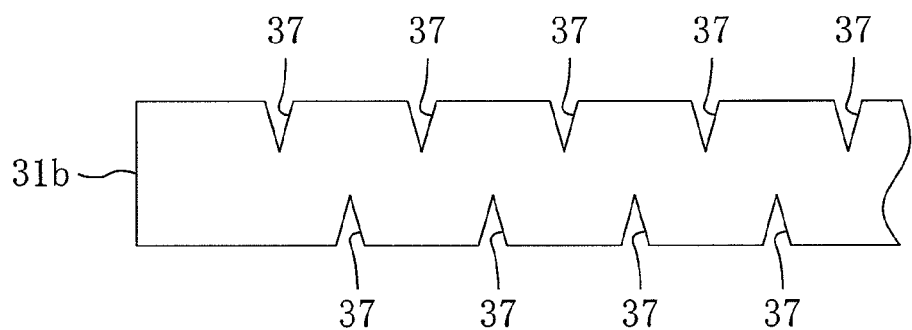
FIG. 7 is a cross section showing an enlarged view of part of another structure of the dust collecting electrode portion.

Other structures may include, as shown in FIG. 6 and FIG. 7, brushing the surface of the dust collecting electrode portion (31b) of the first electrode plate (31), thereby forming a plurality of guide grooves (37) extending in a vertical direction and spaced from each other in a horizontal direction and forming a recessed and protruding portion. The water droplets (21a) enter in the recessed and protruding portion. As a result, the interfacial tension is reduced.

—Operational Behavior—

Next, an operational behavior of the air purification device (10) according to the present embodiment will be described. During an operation of the air purification device (10), the blower fan (14) and the water circulation pump (52) are in operation. Further, a voltage is applied from the power supply (23) to the spray nozzle (21) and the discharge electrodes (22), and a voltage is applied from the power supply (34) to the first electrode plates (31) and the second electrode plate (32).

When the blower fan (14) is activated, the air exhausted from the kitchen space is drawn into the casing (11) from the inlet (12). The air in the air passageway (15) of the casing (11) flows downward and passes through the discharge spray portion (20). A streamer discharge is caused at the discharge spray portion (20), from the discharge electrodes (22) to water sprayed from the spray nozzle (21).

Due to this streamer discharge, active species (high energy electrons, ions, ozone, radicals, and other excited molecules (such as excited oxygen molecules, excited nitrogen molecules, and excited water molecules)) are generated at the discharge spray portion (20). Since a large amount of water is supplied to the discharge field, generation of OH radicals is particularly stimulated in the presence of the water. Further, the generated active species adhere to sprayed water, and are dispersed together with the sprayed water, thereby increasing the dispersibility of the active species.

Then, harmful substances and odorous substances in the air react with the active species, and are thereby oxidized and decomposed, and removed. Among the odorous substances, hydrophilic substances are absorbed and caught in the sprayed water. Among the odorous substances, hydrophobic substances are easily changed into hydrophilic substances by being oxidized by the active species. Therefore, the odorous substances changed into the hydrophilic substances, too, are absorbed and caught in the sprayed water.

As described above, harmful substances or the like are efficiently removed at discharge spray portion (20) due to the effect of oxidation and decomposition of the harmful substances or the like by a streamer discharge, and the effect of absorption/dissolution of the harmful substances or the like (i.e., scrubbing effect) by utilizing sprayed water from the spray nozzle (21). Such a removal of the harmful substances or the like is conducted in the downstream side of the discharge spray portion (20) in the air passageway (15) as well.

The air having passed through the discharge spray portion (20) flows further downward, and passes through the dust charge and collecting portion (30). At the dust charge and collecting portion (30), the air first passes between the charge electrode portion (31a) and the ionizing electrode (33). Here, a corona discharge is caused between the ionizing electrode (33) and the charge electrode portion (31a). Due to the corona discharge, oil mists or the like in the air are negatively charged. After that, the air passes between the second electrode plate (32) and the dust collecting electrode portion (31b). As a result, the negatively charged oil mists or the like adhere to the surface of the dust collecting electrode portion (31b) serving as a positive pole. Specifically, the oil mists or the like are attracted to and captured by a dust collecting surface of the dust collecting electrode portion (31b), the dust collecting surface facing in a horizontal direction. As a result, oil mists or the like in the air are removed.

In the above operational behavior, oil mists in the air successively adhere to the surface of the dust collecting electrode portion (31b). Thus, the surface (in particular the dust collecting surface) of the dust collecting electrode portion (30b) may be coated with oil or the like. If the dust collecting surface is coated with oil as described above, water droplets (21a) tend to adhere to the dust collecting surface. If the dust collecting surface becomes soiled, an available surface area which contributes to capturing dust is reduced, and as a result, the dust collection capability for the oil mists or the like is reduced. In view of this, according to the present embodiment, the dust collecting electrode portion (31b) is cleaned with water sprayed from the spray nozzle (21).

Specifically, the water sprayed from the spray nozzle (21) drops down under its own weight, and further flows down together with the air. Then, the water is encouraged to reach the surfaces of the first electrode plates (31) and the second electrode plate (32). As a result, oil or the like adhering to the dust collecting electrode portion (31b) is washed off with the sprayed water. Further, if oil adheres to the second electrode plate (32) and the ionizing electrode (33), the oil is washed off by the sprayed water as well. Moreover, since the first electrode plates (31) and the second electrode plate (32) are in a vertical position, the sprayed water runs down along the surface of the electrode plates (31, 32). Thus, the effect of cleaning the electrode plates (31, 32) is improved.

Moreover, the sprayed water contains the above-described active species. Therefore, oil or the like adhering to the electrode plates (31, 32) is gradually oxidized and decomposed by these active species. As a result, the oil or the like is changed into a hydrophilic substance, and is easily dissolved in the sprayed water. Thus, the effect of cleaning the electrode plates (31, 32) is further improved.

Here, if water droplets (21a) adhere to the dust collecting surface of the dust collecting electrode portion (31b), these fine water droplets (21a) gather together on the dust collecting surface and increase in size, and an abnormal discharge such as a spark may be caused at the time of discharge. However, according to the present embodiment, the dust collecting electrode portion (31b) is made of a plate-like member having a mesh-like structure with a plurality of pores. Thus, the water droplets (21a) adhering to the dust collecting surface enter in the pores in the surface, thereby reducing the interfacial tension. As a result, it is possible to prevent the water droplets (21a) adhering to the dust collecting surface from gathering together and increasing in size, and prevent an abnormal discharge, such as a spark, caused by the discharge from the dust collecting electrode (31b).

Further, at the dust charge and collecting portion (30), the dust collecting surface etc. of the dust collecting electrode portion (31b) is appropriately cleaned, thereby ensuring a surface area available for the dust collection. As a result, a desired capability of collecting dust at the dust charge and collecting portion (30) is maintained for a long time.

The air which has passed through the dust charge and collecting portion (30) flows further downward, and passes through the demister portion (40). At the demister portion (40), water droplets (21a) in the air are physically captured. The air from which harmful substances and odorous substance, and oil mists and water, etc., are removed in this way, is discharged to the outside through the outlet (13).

On the other hand, the water captured by the demister portion (40) drops down to be collected in the reservoir (16). The water stored in the reservoir (16) is drawn into the water circulation channel (51) by the water circulation pump (52), passes through the water filter (53), and is again sprayed from the spray nozzle (21) into the air.

Although the air purification device (10) according to the present embodiment is used for treating a gas exhausted from the kitchen space, the air purification device (10) can be utilized as an air purifier for household use as well.

INDUSTRIAL APPLICABILITY

As described above, according to the present invention, water droplets are prevented from increasing in size on the surface of a dust collecting electrode, and a decrease in the dust collection capability due to adhesion of dust or the like can be reduced. Thus, the present invention has considerable advantages in practical use. The present invention is therefore very useful, and can be widely applied in the industry.

The invention claimed is:

1. A dust collector disposed in an air passageway to which water droplets are supplied, for collecting dust including an oil content in an air, the dust collector comprising:
   a dust collecting electrode which electrically attracts dust charged in the air, wherein
   the dust collecting electrode is configured to reduce an interfacial tension between the water droplets adhering to a surface of the dust collecting electrode and the dust collecting electrode, wherein
   the dust collecting electrode is made of a plate member having a mesh structure with a plurality of pores, and
   a wire diameter of a wire rod which forms the dust collecting electrode is set to 0.1 mm or more and 0.5 mm or less.

2. The dust collector of claim 1, wherein
   the dust collecting electrode is disposed in a vertical position, and
   the dust collecting electrode is provided with a pair of reinforcing members which extend in a vertical direction along the surface of the dust collecting electrode and by which the dust collecting electrode is sandwiched.

3. The dust collector of claim 1, wherein
   the dust collecting electrode is disposed in a vertical position,
   the dust collecting electrode is provided with a pair of reinforcing members which extend in a horizontal direction along the surface of the dust collecting electrode and by which the dust collecting electrode is sandwiched, and
   the pair of reinforcing members are disposed at locations which do not overlap with each other when viewed from a direction along the surface of the dust collecting electrode.

4. A dust collector disposed in an air passageway to which water droplets are supplied, for collecting dust including an oil content in an air, the dust collector comprising:
   a dust collecting electrode which electrically attracts dust charged in the air, wherein
   the dust collecting electrode is configured to reduce an interfacial tension between the water droplets adhering to a surface of the dust collecting electrode and the dust collecting electrode, wherein
   the dust collecting electrode is made of a plate member having a mesh structure with a plurality of pores, and
   a wire diameter L of a wire rod which forms the dust collecting electrode, and an opening width W of the mesh are set to satisfy a condition $1 \leq W/L \leq 4$.

5. The dust collector of claim 4, wherein
   at least the surface of the dust collecting electrode is made of a hydrophilic material.

6. The dust collector of claim 4, wherein
   the dust collecting electrode is disposed in a vertical position, and
   the dust collecting electrode is provided with a pair of reinforcing members which extend in a vertical direction along the surface of the dust collecting electrode and by which the dust collecting electrode is sandwiched.

7. The dust collector of claim 4, wherein
   the dust collecting electrode is disposed in a vertical position,
   the dust collecting electrode is provided with a pair of reinforcing members which extend in a horizontal direction along the surface of the dust collecting electrode and by which the dust collecting electrode is sandwiched, and
   the pair of reinforcing members are disposed at locations which do not overlap with each other when viewed from a direction along the surface of the dust collecting electrode.

* * * * *